US006345767B1

United States Patent
Burrus, IV et al.

(10) Patent No.: US 6,345,767 B1
(45) Date of Patent: Feb. 12, 2002

(54) SYSTEM AND METHOD FOR CONTROLLING THE INTERIOR TEMPERATURE OF A VEHICLE

(75) Inventors: Philip H. Burrus, IV, Lilburn; Felipe J. Farley, Smyrna, both of GA (US); Nicholas C. Hopman, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/542,656

(22) Filed: Apr. 4, 2000

Related U.S. Application Data

(60) Provisional application No. 60/138,479, filed on Jun. 1, 1999.

(51) Int. Cl.[7] .............................................. G05D 23/00
(52) U.S. Cl. ................................................... 236/1 R
(58) Field of Search .......................... 236/1 R; 62/132; 454/221, 265, 177, 335, 358; 318/280; 361/695

(56) References Cited

U.S. PATENT DOCUMENTS

| | | | | |
|---|---|---|---|---|
| 3,729,735 A | * | 4/1973 | Dageford ..................... | 137/565 |
| 4,035,796 A | * | 7/1977 | Hedly et al. ................ | 236/1 C |
| 4,274,475 A | * | 6/1981 | Rall et al. .................... | 165/211 |
| 4,338,511 A | * | 7/1982 | Six ............................. | 219/497 |
| 4,852,469 A | * | 8/1989 | Chuang ....................... | 454/75 |
| 4,948,045 A | * | 8/1990 | Romano ..................... | 236/51 |
| 5,054,686 A | * | 10/1991 | Chuang ...................... | 236/49.3 |
| 5,330,385 A | * | 7/1994 | Hotta et al. ................... | 454/75 |
| 5,731,953 A | * | 3/1998 | Sakurai ....................... | 361/695 |
| 5,926,776 A | * | 7/1999 | Glorioso et al. ............ | 702/130 |

* cited by examiner

Primary Examiner—Teresa Walberg
Assistant Examiner—Daniel Robinson
(74) Attorney, Agent, or Firm—Steven A. May

(57) ABSTRACT

A system and method for controlling the interior temperature within a vehicle. In a preferred embodiment of the system, the system responds to increases in exterior temperature by reducing the interior temperature of the vehicle passenger compartment. The system preferably includes a temperature sensor within the passenger compartment and a microprocessor programmed to respond to signals from the temperature sensor. The microprocessor operates to roll down windows and/or engage a fan or air conditioning unit until a desired and comfortable temperature is achieved within the passenger compartment. The user can pre-program the system with settings that are stored in a memory or use factory default settings. A moisture sensor can also be coupled to the microprocessor to respond to rainy conditions. In one alternate embodiment, a two-way paging and cellular network module is included to contact the vehicle operator when the system is engaged. In another alternate embodiment, the system is programmed to increase the interior vehicle temperature in response to decreases in the exterior ambient temperature by engaging the heater unit of the vehicle.

18 Claims, 2 Drawing Sheets

SYSTEM AND METHOD FOR CONTROLLING THE INTERIOR TEMPERATURE OF A VEHICLE

RELATED APPLICATIONS

This application is a regular patent application that claims priority to a provisional patent application, Ser. No. 60/138,479, filed on Jun. 1, 1999, and assigned to the assignee of the present application.

BACKGROUND OF THE INVENTION

Summer usually brings warmer temperatures to most regions of the United States and particularly in the South where temperatures can become excessive. On a typical July day, it is not uncommon to see temperatures well above 100 degrees in the southern states. In Texas last year, for example, temperatures in excess of 110 degrees Fahrenheit were recorded on numerous days.

The interior of cars exposed to such climates can reach exceedingly high temperatures, which at times may become in excess of 280 degrees. In fact, even in milder climates, car interiors can heat to unbearable levels where the outside temperature is not so excessive. A shaded, closed car can reach 90 degrees in just five minutes, and 110 degrees in 25 minutes, when the outside temperature is only 78 degrees. In the sun, a car interior can reach very high temperatures in a short amount of time, sometimes reaching a temperature of 200 degrees in just a few minutes. This phenomenon is the result of the infrared and ultraviolet light that penetrates a car's windshield and windows. Instead of these light waves escaping or passing through the vehicle interior, they are reflected around throughout the automobile causing or resulting in a tremendous temperature rise within the vehicle.

People are growing ever more health conscious. Numerous articles and television stories warn of leaving pets and children unattended in automobiles. There have recently been numerous reports of both pets and children, after being left in a closed car on a sunny day, who have died from heat exposure. Dr. Erna Braun, a veterinarian, concluded: "Once an animal has been confined to a small space like a car and the ambient temperature rises to 110 or 120 degrees, it is only a matter of minutes until the animal will succumb to heat exhaustion."

Modern automobiles manufactured today typically include a microprocessor. The microprocessor is responsible for obtaining data from various systems throughout the car, processing this data, and then activating and deactivating control systems. Fundamental systems run by the microprocessor include the catalytic converter and emissions control systems, manifold temperature and pressure systems, fuel and oil pressure and control, and exhaust control. Other systems include speedometer, tachometer, transmission control, radio and air conditioning.

Companies such as Motorola have already developed advanced microprocessors specifically for automobiles. These advanced processors are capable of, in addition to the functions mentioned above, speech recognition, wireless communications and Internet access. These sophisticated processors have processing power to support real-time information, entertainment, communications and navigation applications for the car. In short, there is already a vast amount of processing power within an automobile and it will increase in the future.

What is lacking in the art is a combination of a temperature sensing and optional motion/occupant sensing system with the fundamental processing and control capability of the car's internal microprocessor in order to create a vehicle temperature safety system. With the increased sophistication in today's automobiles, including split climate control, automatic anti-theft devices, global positioning systems and driving directions, this system is a natural extension that can reduce the health risk of remaining in a vehicle for extended periods of time and may even save both pet's and people's lives.

DETAILED DESCRIPTION OF THE PRESENTLY PREFERRED EMBODIMENTS

The present invention provides a temperature sensor for the interior of an automobile or other enclosed structure that is subject to heating by exposure to the sun. When the temperature sensor detects that the temperature inside the car is rising, or when it reaches a programmable level, e.g., 90 degrees Fahrenheit, the sensor communicates back to a processor that automatically rolls down the windows a predetermined amount, e.g., ½% inch.

If the temperature continues to rise, the temperature sensor also detects this increase and signals the processor to take additional steps to ameliorate the condition, such as to continue to roll down the windows. As the temperature continues to rise, the same or similar steps can be performed by the processor so that the windows continue to be lowered until they reach a pre-programmed limit or become fully opened. If the temperature still continues to rise, the processor may then turn on the fan, and can be further programmed to eventually engage the air conditioning unit in the car.

Figure 1:
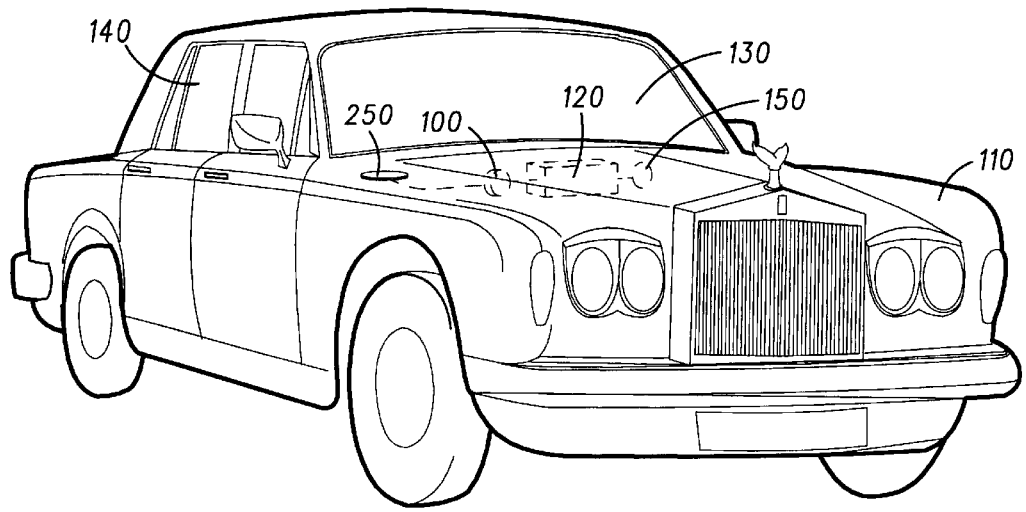
FIG. 1 is a representative view of an automobile having a temperature sensor located in the passenger compartment.

Referring first to FIG. 1, the preferred embodiment of this system comprises a temperature sensor 100, which is preferably placed inside the car 110 in the passenger compartment 130. The temperature sensor should be disposed in a location where the temperature within passenger compartment 130 can be accurately sensed. A microprocessor 120 is preferably located in the dashboard unit (not shown) of the automobile 110 along with the other automotive electronics typically included in this portion of the vehicle 110. Additional electronics (described below) are dispersed in the dashboard and/or within the engine compartment (not shown) to communicate with the temperature sensor 100 and the microprocessor 120 to complete the system.

An occupant sensor 150 is also included within the passenger compartment 130 and is coupled to the microprocessor 120. The occupant senor 150 is used to determine whether a person or animal is present in the passenger compartment 150 of the car 110. This is useful, as will be explained below, because any temperature lowering activity, like rolling down a window, may be conditioned upon detecting the presence of a person or animal.

Figure 2:
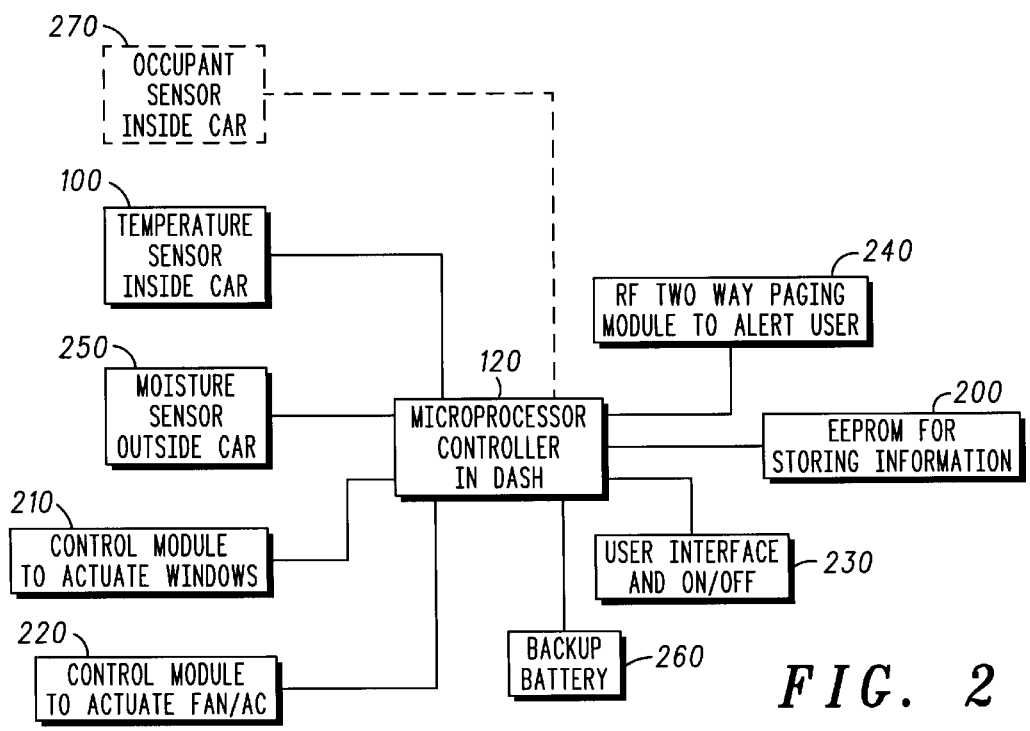
FIG. 2 is a block diagram of a system for controlling the passenger compartment temperature of the vehicle shown in FIG. 1.

As shown in FIG. 2, such additional electronics preferably include a non-volatile memory device 200, preferably in the form of an EEPROM, for storing data, parameters, commands, information and user inputs. The system also preferably includes two control modules—a control module 210 for actuating the windows 140 (FIG. 1), and a control module 220 for actuating the fan and air conditioning system (not shown) in the vehicle 110. A user interface 230 is also provided for engaging the system, and for setting and programming operating levels and disabling the system. An optional two-way paging and cellular network module 240 is also preferably included in the system for user notification purposes (described in greater detail below). A moisture sensor 250, which is preferably disposed outside of the passenger compartment 130 (FIG. 1) and on the exterior surface of the vehicle 110, can also be included in an alternate embodiment of the system. A back-up battery 260 may also be included to power the system.

The microprocessor 120 associated with the system is preferably the primary processor that is already installed within the car 110. The processing functions are fundamental, in that they involve interpreting analog and digital data, processing the data, and then switching ON and OFF control modules like relays and stepper motors. The processing is so rudimentary that it can be done by a 68HC05 processor manufactured by Motorola. Additionally, the microprocessor functions associated with this invention are easily implemented with analog circuits, discrete logic and field programmable gate array (FPGA) devices.

The temperature sensor 100, an optional occupant sensor 270, and moisture sensor 250 are all analog or digital devices that generate electrical signals that are proportional to the temperature within the car, the motion within the car, and moisture outside the car. The occupant sensor 270 can take on many forms such as a motion sensor. Various means for sensing temperature (for example, the B05/07/10/14 series glass encapsulated Negative Temperature Coefficient (NTC) thermistors manufactured by Keystone Thermometrics), motion (for example the Leviton 25221 Occupancy sensor), and moisture (for example the FMC series moisture sensor, manufactured by Brookhuis) are well known in the art. Also, numerous materials have described varied methods of each.

The control modules 210, 220 are variable ON/OFF drive mechanisms that are also well known in the art. Various control means include stepper motors, relays, switches, transistors, amplifiers, drive circuits and feedback circuits. The user interface 240 is a means by which the user can enable and disable the system 100 and enter and retrieve data, as described below. The two-way paging and cellular network module 240 includes means by which the user can be notified of potential problems. Alternate embodiments of the two-way paging and cellular network module 240 include the capability of sending a page through traditional paging means, making a cellular call through traditional means, sending a two-way radio transmission through traditional means, and activating the car's alarm system, horn or lights (not shown).

In operating the system shown in FIGS. 1 and 2, the user first enables the system. In the preferred embodiment, the system is automatically engaged upon insertion of a key into the steering column ignition lock (not shown) in the vehicle 110. Once engaged, the microprocessor 120 is programmed to preferably query the user for certain inputs. For example, the user may be asked to input temperature levels or thresholds at which the system would activate, the distance the windows will roll down in response to certain other conditions, whether or not to page the user, and the condition under which the fan and/or the air conditioner would come on and how long it should run, etc. Once the data has been input, the processor 120 stores this information in the memory 200 for future reference. Those skilled in the art will appreciate that although an EEPROM memory is presently preferred for information storage, various other memory devices can be employed for this function without departing from the essential spirit and scope of the system.

Alternatively, the system may be programmed at the factory with default settings for the input parameters. The preferred embodiment may thus include a default mode, where the user would not need to enter any data. The user would simply arm or engage the system according to preprogrammed factory settings upon vehicle start-up, and the system would use the factory default data during operation.

Once programmed, the system takes over and operates automatically, until disabled by the user, to monitor interior vehicle temperature sensed by the temperature sensor 100. Through the two control modules 210, 220 the system can control the windows 140 and operate the fan/air conditioning unit (not shown) as necessary when certain conditions arise. For example, in the operation of the system, the user may have programmed the microprocessor 120 so that the windows roll down one inch at 90 degrees, 2 inches at 110 degrees, and all the way down at 120 degrees. Further, the user may have programmed the processor 120 for the air conditioning to come on if the temperature does not fall below 90 degrees with the windows all the way down. The user may also desire to be paged when the air conditioning comes on to ensure that the battery (not shown) does not die or to engage the back-up battery 260, or to be alerted that the windows to the vehicle are completed open. The user programs this information into the system through the user interface 230, and the system then begins monitoring the vehicle interior through the temperature sensor 100. The system can be disabled by the user preferably by an ON/OFF feature within the user interface 230 located on the vehicle dashboard, or alternately by remote operation through the two-way paging and cellular network module 240.

The preferred embodiment could be expanded to include occupant sensors 270 that would further engage the system, as mentioned above. In this embodiment, when a pet or child is left in the car, the system would either engage itself automatically, or take steps to reduce interior temperature, by detection of the movement of the person or animal. Sophisticated systems could use infrared technology to detect a specific heat source, namely a person or pet, located within the vehicle. In so doing, the system would only enable itself when necessary, so as to avoid unwanted vehicular entry or battery depletion.

It is understandable that some users may be concerned about unauthorized access when the windows of the vehicle 110 are rolled down. An alternative embodiment therefore may include only the occupant sensor 270 and temperature sensor 100 without the window control module 210. There are numerous ways, however, that these two sensors alone could notify the user that unsafe conditions existed in the car 110. For example, the sensors 210, 270 could activate a car alarm (not shown), or dial a cellular telephone number or page the user through the two-way paging and cellular network module 240 if the appropriate condition is detected. With only these sensors, the user would be ensured greater auto security without jeopardizing the health and safety of people and animals inside the vehicle. In an alternate embodiment, the fan/air conditioning control module 220 can also be included to decrease interior temperature through the air conditioning system and not be accessing or opening the vehicle windows 140.

Figure 3:
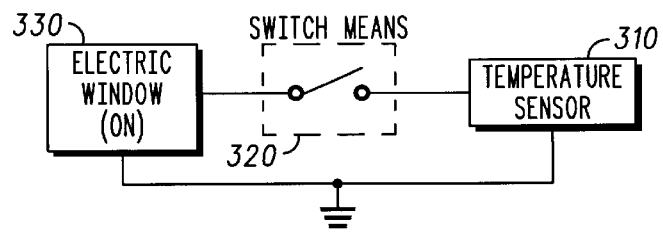
FIG. 3 is a simplified block diagram of one alternate embodiment to the system shown in FIG. 2.

The simplest embodiment of the invention is shown in FIG. 3. Here, the system comprises a temperature sensor 310 coupled to a switch means 320 that is coupled to the electrically powered windows 330. When the temperature hits a predetermined point, the switch means 320 closes and the windows 330 roll down.

In a further alternate embodiment of the system, a vehicle metrics device (not shown) is also coupled to the processor 120. This device is constricted from one or more sensors and is used to determine whether or not the vehicle is being operated by a driver, who is presumably in control of the cooling of the passenger compartment. Sensors may include a vehicle motion or speed sensor, a sensor detecting actuation of the steering wheel, brake pedal, transmission shifter, accelerator pedal, or any other sensor suitable for determining if the vehicle is being operated.

Figure 4:
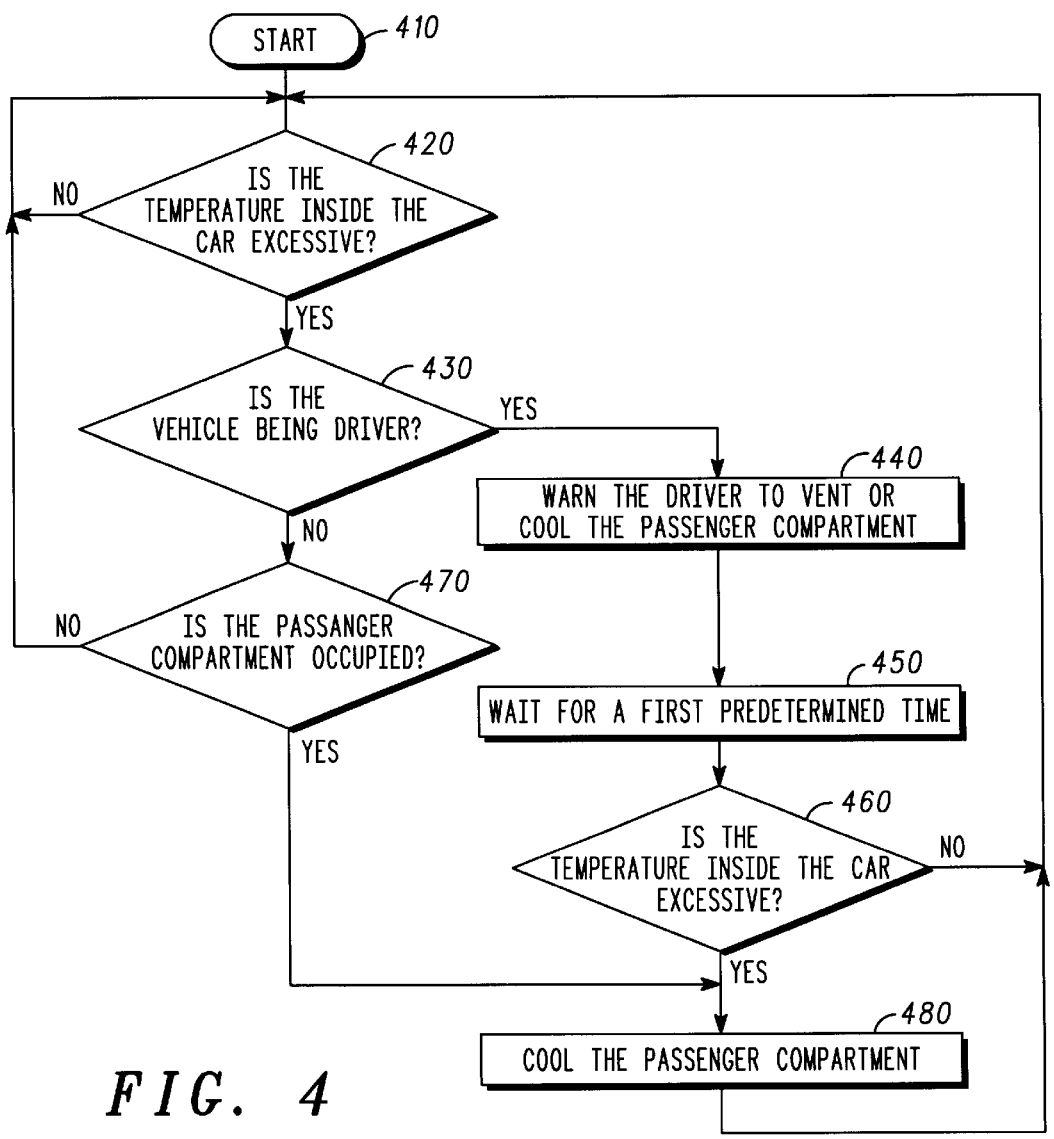
FIG. 4 is a flow chart showing a method of controlling the passenger compartment temperature of the vehicle shown in FIG. 1.

FIG. 4 illustrates method steps in accordance with the preferred embodiment. The described method steps are programmed into the processor 120, and stored in the memory device 200. The method, or routine, runs continuously and commences with a start step 410.

In step 420 the temperature sensor 100 sends a reading to the processor 120. The processor 120 determines whether or not the temperature inside the passenger compartment 130 of the vehicle 110 is excessive. If the temperature inside the passenger compartment 130 of the vehicle 110 is not excessive, the routine returns to step 420. If the temperature inside the passenger compartment 130 of the vehicle 110 is excessive, then step 430 is executed. At step 430, the system determines if the vehicle 110 is being driven. If so, the system sends out a warning to the driver at step 440 to vent or cool the passenger compartment 130. A predetermined wait interval is performed at step 450, and a test is performed at step 460 to determine if the interior temperature is still excessive. If not, the program returns to step 420.

If the vehicle was not being driven at step 430, then the system determines if the passenger compartment 130 is occupied at step 470. If not, the program returns to step 420. If so, or if the interior temperature of the vehicle is still excessive as determined at step 460, then the system begins to take the steps described above to cool the passenger compartment. Preferably, the system begins by rolling down windows, then activating the fan and eventually the air conditioning unit of the vehicle. Those skilled in the art will again appreciate that the method illustrated in FIG. 4 can also be performed with minimum modifications in order to heat a vehicle passenger compartment 130 is excessively cold ambient or exterior conditions.

The new elements associated with above-described system include a safe means of reducing the temperature inside a vehicle on hot days. More specifically, the system combines a temperature sensor 100, moisture sensor 250, and microprocessor 120 or micro-controller for unattended automotive safety in a fashion that has not been previously known in the art.

The system thus allows people who routinely run errands in warm climates with pets or children in a car to make brief stops without subjecting the animal or child to extreme temperatures. Also, florists, perishable goods businesses, delivery men, etc., could use a derivative of the system to keep goods fresh throughout a delivery run or throughout the working day. Those skilled in the art will readily appreciate that the preferred system can be applied to other transportation vehicles such as buses and childcare vans to also help prevent children from being harmed by prolonged exposure inside such vehicles on hot days. Alternatively, the system can be readily modified to protect and control the occupants of a vehicle in the event of excessively cold environments by engaging the heating apparatus (not shown) of the vehicle 110 or take other similar actions along the lines described above without departing from the essential spirit and scope of the preferred embodiments.

Impediments to the use of such systems, such as crime, rain and dead batteries that could potentially limit the benefits of such a system, are easily overcome, as the sensor and processor may be disengaged by the driver. Preferably, this can be done at any time either by directly accessing the system or by remote operation. The preferred system may be expanded to include a two-way paging feature where, when the system vents the car, the system pages the driver to let the driver know what is happening. The driver may likewise send a return page to disable the system if desired. Additionally, the maximum distance for the windows to be rolled down in the event the system is engaged is preferably programmable by the user. Maximum limits may be set that will minimize the risk of entry into the vehicle via the opened window(s).

In case of rain, two alternate solutions are apparent. First, it is practically difficult to reach very high interior compartment temperatures (e.g., 150+ degrees) in a car when it is raining outside. Second, an external moisture sensor could be also be added to detect inclement weather and to which the processor 120 would be programmed to respond appropriately. Windows 140 may be opened a lesser amount, for example, if such conditions are met.

With the increased sophistication in today's automobiles, including split climate control, automatic anti-theft, GPS and driving directions, etc., the system and method described above is a unique extension that may save both pet's and people's lives.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

We claim:

1. A system for detecting and communicating an undesirable condition inside a vehicle when the vehicle is off, the system comprising:
   a temperature sensor disposed in the interior of the car;
   a processor contained within the vehicle, the processor responsive to a signal from the temperature sensor and operative to compare the signal received from the temperature sensor to a temperature threshold and generate at least one control signal based on the comparison; and
   a wireless communication module coupled to the processor operative to communicate with a vehicle operator in response to the at least one control signal.

2. The system defined in claim 1, wherein the at least one control module comprises a window actuator module.

3. The system defined in claim 1, wherein the at least one control module comprises a fan/air conditioning actuator module.

4. The system defined in claim 1, wherein the interior vehicle temperature is reduced.

5. The system defined in claim 1, further comprising an occupant sensor coupled to the processor.

6. The system defined in claim 1, further comprising a moisture sensor coupled to the processor, the moisture sensor operative to sense exterior moisture.

7. The system defined in claim 1, further comprising at least one control module housed within the vehicle, the at least one control module responsive to the at least one control signal to modify interior vehicle temperature.

8. The system defined in claim 1, further comprising a memory coupled to the processor, the memory operative to store control parameters.

9. The system defined in claim 1, further comprising a user interface coupled to the processor.

10. A method for detecting and communicating an undesirable condition inside a vehicle when the vehicle is off, the method comprising the steps of:

sensing the interior of the vehicle through a temperature sensor disposed in the interior of the vehicle;

comparing the sensed interior to an interior threshold;

generating at least one control signal based on the comparison; and transmitting a radio frequency signal to a vehicle operator in response to the at least one control signal.

11. The method defined in claim 10, further comprising the step of modifying an interior temperature of the vehicle based on the at least one control signal.

12. The method defined in claim 11, wherein the vehicle interior temperature is modified by accessing a window actuator module.

13. The method defined in claim 11, wherein the vehicle interior temperature is modified by accessing a fan/air conditioning actuator module.

14. The method defined in claim 11, wherein the step of modifying an interior temperature of the vehicle comprises a step of reducing an interior temperature of the vehicle based on the at least one control signal.

15. The method defined in claim 10, further comprising the step of sensing the presence of an occupant within the vehicle.

16. The method defined in claim 10, further comprising the step of sensing exterior moisture via a moisture sensor.

17. The method defined in claim 10, further comprising the step of storing system control parameters in a memory.

18. The method defined in claim 10, further comprising the step of communicating to the user of the vehicle through a user interface.

* * * * *

UNITED STATES PATENT AND TRADEMARK OFFICE
CERTIFICATE OF CORRECTION

PATENT NO. : 6,345,767 B1
DATED : February 12, 2002
INVENTOR(S) : Burrus IV et al.

It is certified that error appears in the above-identified patent and that said Letters Patent is hereby corrected as shown below:

Column 6,
Lines 57, 59 and 62, reads "claim 1", should be -- claim 7 --

Signed and Sealed this

Eighth Day of July, 2003

JAMES E. ROGAN
*Director of the United States Patent and Trademark Office*